United States Patent [19]

Berg et al.

[11] 4,110,016

[45] Aug. 29, 1978

[54] ACOUSTO-OPTIC REAL TIME CORRELATOR

[75] Inventors: Norman J. Berg, Baltimore, Md.; Bob Lorin Smith, deceased, late of Huntsville, Ala.; by Allen B. Adams, legal representative, Cupertino, Calif.

[73] Assignee: The United States of America as represented by the Secretary of the Army, Washington, D.C.

[21] Appl. No.: 804,203

[22] Filed: Jun. 7, 1977

[51] Int. Cl.$^2$ .............................................. H03H 9/26
[52] U.S. Cl. ................................. 350/358; 350/96.13
[58] Field of Search .................... 350/169, 358, 96.13, 350/96.14; 235/181; 333/30 R

[56] References Cited

U.S. PATENT DOCUMENTS 4,012,120  3/1977  Kagiwada et al. ............... 350/358

*Primary Examiner*—William L. Sikes
*Attorney, Agent, or Firm*—Nathan Edelberg; Robert P. Gibson; Saul Elbaum

[57] ABSTRACT

An acousto-optic correlator device comprised of two parallel piezoelectric crystals having different acoustic velocities. Acoustic transducers are located at one end of the respective crystals, and high frequency acoustic waves, the pulse envelopes of which correspond to the signals to be correlated are simultaneously launched from the transducers on the respective crystals. One of the acoustic waves "slides" past the other, and a laser beam, which is directed approximately perpendicular to the direction of acoustic propagation is modulated by the acoustic waves. The laser beam is demodulated and the desired correlation is obtained.

5 Claims, 5 Drawing Figures

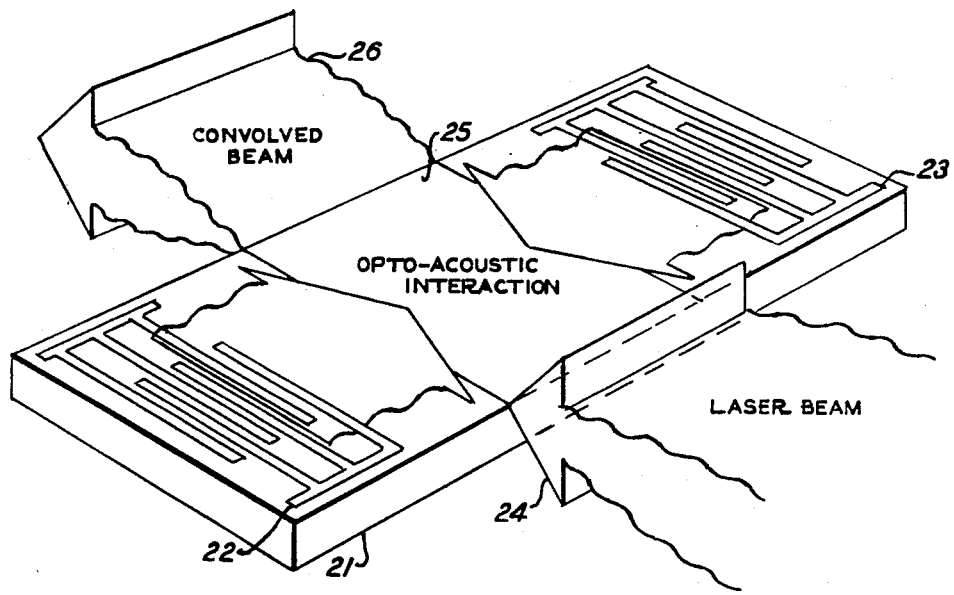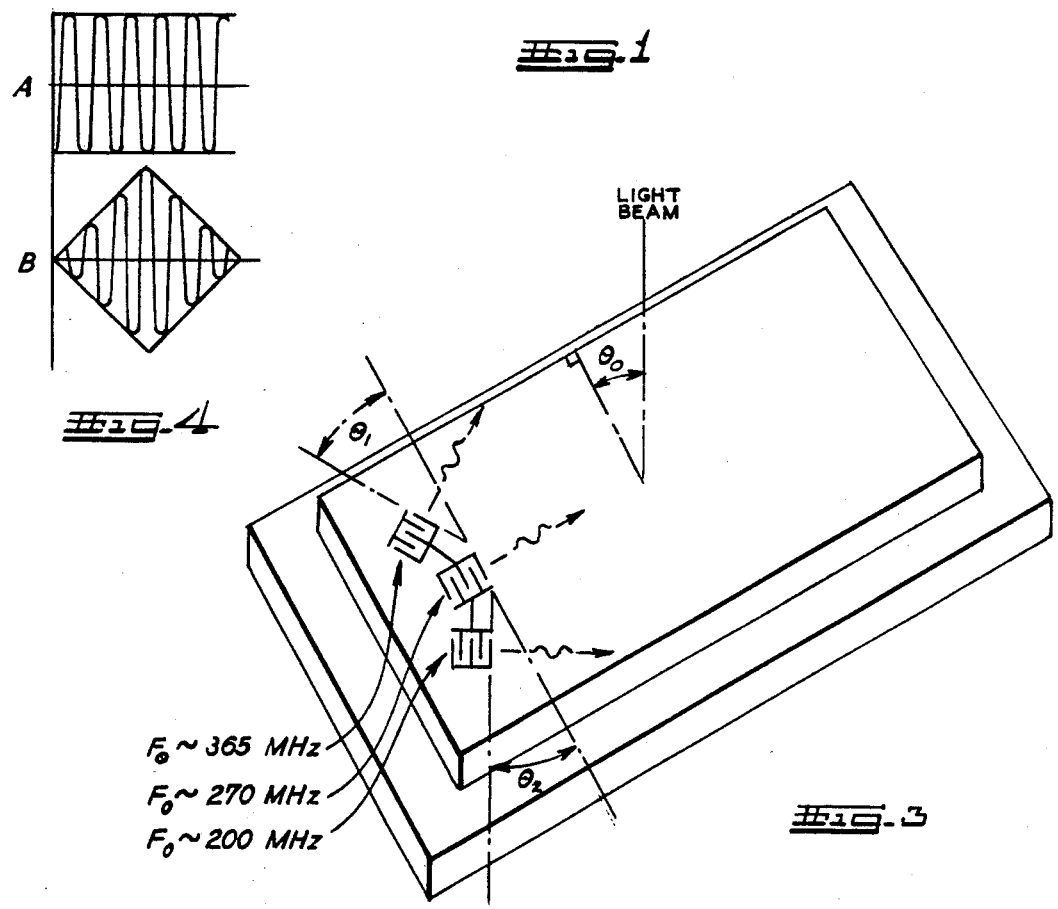

ACOUSTO-OPTIC REAL TIME CORRELATOR

RIGHTS OF THE GOVERNMENT

The invention described herein may be manufactured, used, and licensed by or for the U.S. Government for governmental purposes without the payment to us of any royalty thereon.

The present invention is directed to an improved apparatus and device for performing correlation operations.

As is well known, correlation techniques are widely utilized in electrical engineering in the signal processing and communications fields. These techniques are particularly advantageous in separating a signal from a noisy environment and therefore have found particular usefulness in such areas as radar signal processing, satellite signal processing, and spread spectrum communications wherein the information to be detected is ordinarily beneath the level of the noise. It has been proven that a correlator or convolver can potentially provide the greatest signal to noise ratio improvement of any signal processor.

A need has existed in the prior art for the provision of a high performance, relatively economical analog correlator, and it is to the fulfillment of that need that the present invention is directed. Known digital correlators are extraordinarily expensive, and known analog surface-acoustic wave devices do not meet the desired high performance standards. While a relatively high-performance analog convolver device is known in the prior art, before a convolver can be used for correlation, the input signal thereto must be time inverted, which is a difficult task to accomplish, especially when dealing with the large time-bandwidth product signals which are frequently of interest in correlation applications.

The time-bandwidth product is a figure of merit ordinarily associated with correlation devices, and it would be desirable for the analog correlator provided by the present invention to have a very high time-bandwidth product. Additionally, it ideally should have a large dynamic range and a high degree of isolation between the input and output.

It is thus an object of the invention to provide a relatively economical, high performance analog correlator.

It is a further object of the invention to provide an analog correlator having a large time-bandwidth product.

It is still a further object of the invention to provide an analog correlator having a large dynamic range.

It is still a further object of the invention to provide an analog correlator having a high degree of isolation between the input and output.

The above objects are accomplished by providing an analog correlator which utilizes an acousto-optic interaction process. Two parallel, adjacent piezoelectric crystals are provided, and the two signals to be correlated are each combined with an R.F. component and are fed to acoustic transducers on the respective piezoelectric crystals. Respective acoustic waves are propagated, and the acoustic velocities of the respective crystals are arranged so that one of the acoustic waves "slides" past the other while the waves traverse the length of the crystal. At the same time, a laser light beam is directed across the surface of the crystals approximately perpendicular to the direction of acoustic propagation, and is modulated by the propagation acoustic waves. Appropriate demodulation of the light beam provides the correlation of the two input signals.

It is found that the device achieves a significant improvement in time-bandwidth product and dynamic range over prior art analog correlation devices.

The invention will be better understood by referring to the drawings, in which:

FIG. 1 is a diagrammatic illustration of a prior art acousto-optic convolver device;

FIG. 3 is a detailed drawing of an illustrative acoustic transducer arrangement;

FIG. 4A represents a typical input waveform which could be applied to the correlator; and FIG. 4B represents the autocorrelated output waveform for the input of FIG. 4A.

Figure 2:
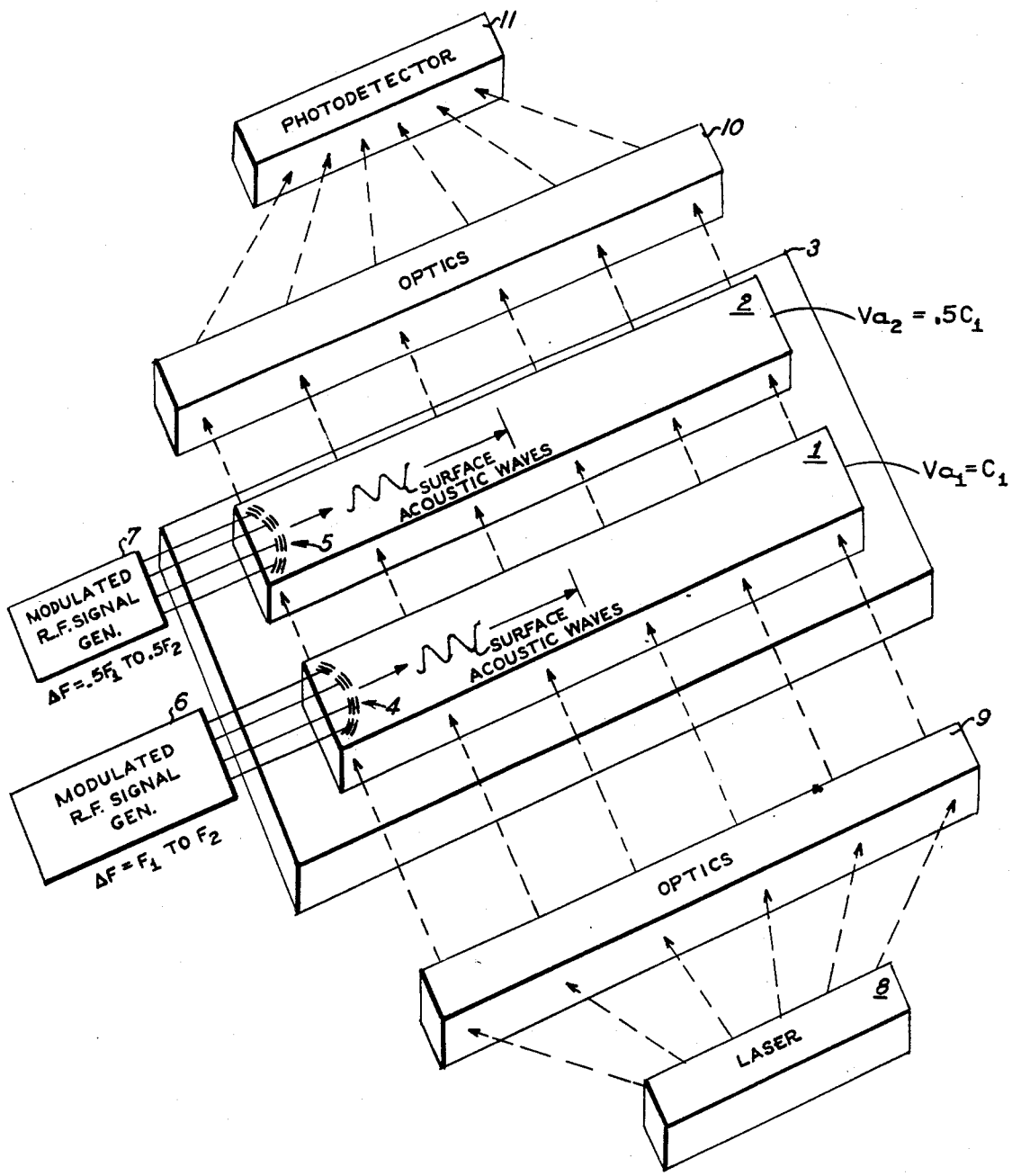
FIG. 2 is a diagrammatic illustration of the acousto-optic correlator apparatus and device of the present invention.

As mentioned above, the correlator device of the present invention employs an acousto-optic phenomenon to modulate a light beam in accordance with the correlation of two input signals. More specifically, the light beam is modulated by being diffracted by an effective diffraction grating or gratings which are created in a piezoelectric medium by propagating high frequency sound waves which have pulse envelopes which correspond to the input signals.

By way of background, diffraction of light by high frequency sound waves, called Brillouin scattering, was first observed in 1932. The development of the laser and advances in high frequency techniques have increased the practical potential of the acousto-optical interaction phenomenon.

An acoustic wave propagating in a medium causes a spatial change in the index of refraction of the medium as a result of the acoustic strain $s$ according to the relationship:

$$\Delta n = -n^3 ps/2$$

wherein $n$ = index of refraction $p$ = electro-optic coefficient.

A light beam impinging on the acoustic wave is scattered as a result of this index of refraction variation just as if it encountered a diffraction grating. Since the acoustic wave is propagating and momentum must be conserved, the frequency of the light wave is shifted by an amount equal to the acoustic frequency.

For lower acoustic frequencies operation is in the Raman-Nath regime, and for higher acoustic frequencies, which the present invention is concerned with, operation is in the Bragg regime. For the most efficient operation in the Bragg regime, the light beam should be incident on the acoustic wave at the Bragg angle $\theta_B$ as defined by:

$$\sin \theta_B = \lambda_o/2n\lambda_a$$

where $\lambda_o$ = optical wavelength $\lambda_a$ = acoustic wavelength $n$ = index of refraction At this angle, constructive interference occurs for the first mode, and all other modes are suppressed.

The acousto-optic correlator of the present invention is best understood by first referring to FIG. 1, which is an illustration of an acousto-optic convolver, known to the prior art.

The body of the convolver is an elongated sheet of piezoelectric crystal 21, such as lithium niobate. At respective ends of the crystal, acoustic transducers 22 and 23 are disposed, and such transducers are known means for converting an electrical signal to a corresponding acoustic wave. A laser, such as a helium-neon laser is arranged to direct a light beam across the top part of the crystal as shown in FIG. 1.

An electrical signal of the form $A(t)\cos w_1 t$ is applied to transducer 22 and a signal of the form $B(t)\cos w_1 t$ is applied to transducer 23 where $w_1$ is an R.F. frequency signal which is amplitude modulated by the envelopes $A(t)$ and $B(t)$ and where $A(t)$ are the signals which are to be convolved with each other. The acoustic waves launched by the respective transducers cross each other in the middle area of the crystal. The light beam, which can be represented by $I_o \cos Wt$ traverses the surface of the crystal in the middle area and is diffracted by the acoustic waves. The intensity of the diffracted light beam is of the form $$K^2 I_o(A(t) B(t) \cos (W - 2w_1)t).$$

This doubly diffracted light beam is focussed on a square-law detector diode and the diode output voltage at double the acoustic frequency is $$V_{out} \sim A(t)B(t)\cos(2w_1)$$

If $A(t)$ and $B(t)$ are pulses whose widths are shorter than the interaction region encompassed by the light beam in FIG. 1, then the focussing process is equivalent to an integration with respect to time. Since the two waves are passing each other, the output varies with respect to a delay time T where T varies from zero, when both pulses overlap, to some maximum value determined by the length of the interaction region. For the conditions described, the output voltage as a function of time is given by $$V_o(T) = \int_{-\infty}^{+\infty} A(t)B(t - T)dt$$

which is equivalent to the convolution of $A(t)$ and $B(t)$.

As is known, it is frequently more useful to obtain the correlation instead of the convolution of two signals. The correlation is defined as $$V_o(T) = \int_{-\infty}^{+\infty} A(t)B(t + T)dt$$

and thus the acousto-optic device shown in FIG. 1 could be used to perform correlation operations if it were possible to conveniently time-invert one of the input signals. Since as a practical matter, time-inversion of a signal, especially high time-bandwidth signals, is extremely difficult to accomplish, the present invention provides an acousto-optic apparatus and device which performs correlation functions without the necessity of time-inversion.

The apparatus and device of the invention is shown in FIG. 2, and is based on the idea, which can intuitively be understood on the basis of the above discussion, that if one acoustic wave is slowly "slid" past the other wave while travelling in the crystal in the same direction, the correlation of the two waves $$R(T) = \int_{-\infty}^{+\infty} F(t)g(t + T)dt$$

will be obtained.

It is only necessary that one wave travel slowly enough with respect to the other wave so that the faster wave can slide entirely past the slower wave within the length of the crystal. It is possible for one of the waves to be stored in the crystal, or as in the embodiment illustrated in FIG. 2, both waves can be generated in real time.

Referring to FIG. 2, two parallel adjacent piezoelectric crystals, 1 and 2, are depicted, and the acoustic waves are launched at acoustic transducer means 4 and 5, respectively, at the same time. The salient requirement of this arrangement is that the acoustic velocity of one of the crystals must be arranged to be slow enough so that the acoustic wave in the other crystal can completely pass the slower wave in the length of the crystal. Then, to ensure that the Bragg angle, $\theta_B$, defined by the relationship $\sin \theta_B = \lambda_o/2n \lambda_a$ as given above, is the same in both crystals, the relative R.F. frequencies are chosen so as to make the acoustic wavelength $\lambda_a$ the same in both crystals.

In an illustrative embodiment, lithium niobate was chosen for the faster crystal 1 and bismuth germanium oxide was chosen for the slower crystal 2. As shown in FIG. 2, the crystals are mounted adjacent each other on a common substrate 3, which for instance may be made of brass. Since the acoustic velocity in bismuth germanium oxide is approximately half of the acoustic velocity in lithium niobate, the acoustic wavelength of a given R.F. frequency in bismuth germanium oxide is equal to the acoustic wavelength of double that R.F. frequency in lithium niobate. Thus, in the illustrative embodiment, in order to make the Bragg angle approximately the same in both crystals, the R.F. frequency of the signal fed to the lithium niobate crystal is double the R.F. frequency of the signal fed to the bismuth germanium oxide crystal.

As shown in FIG. 2 a wide laser beam is directed so as to traverse the surfaces of both crystals. The beam is modulated by the acoustic waves, and is demodulated by a square wave photodetector 11 such as a PIN diode; the mixing in the detector contains all the necessary terms to obtain the desired correlation function. In the illustrative embodiment, detection is at the R.F. frequency which is fed to piezoelectric crystal 2, as will now be demonstrated.

If the optical frequency is W the optical wave is of the form Io cos Wt. After being diffracted by the first crystal, the wave is of the form:

$$k_1 Io \cos (W + w_1)$$

After being diffracted again by the second crystal, the wave is of the form $$k_2 k_1 Io \cos (W + w_1 - w_2)$$

There is a parallel component of the light which remains undiffracted, and when the double diffracted component mixes in the photodetector with the undiffracted component, the result is of the form:

$$k_2 k_1 Io \cos (w_1 - w_2)$$

since $w_2 = w_1/2$, then output $\sim k_2 k_1 Io \cos w_2$.

Hence, the original, electrical signal can be at a frequency $w_2$, this can be doubled, and the original signal can be fed to crystal 2 in FIG. 2 while the doubled signal is fed to crystal 1.

As mentioned above, the diffraction of light by sound is most efficient when the light wave vector is at the Bragg angle to the acoustic wave vector where $\sin \theta_B = \lambda_o/2n \lambda_a$. For the frequencies of interest the angle $\theta_B$ is small, and therefore can be approximated by:

$$\theta_B = \lambda_o/2n \lambda_a$$

The Bragg angle requirement imposes an effective bandwidth limitation on the device. However, if one could vary the angle between the light wave vector and the acoustic wave vector simultaneously with changes in center frequency, a very large bandwidth could be obtained. In the present device, this situation is approximated by tilting the transducers so as to be at very small angles with respect to the longitudinal direction of the crystal. For instance, in FIG. 3, three acoustic transducers are illustrated, with the side transducers being tilted with respect to the middle transducers by very small angles $\theta_1$ and $\theta_2$ where these angles represent the differences in the Bragg angle between the center frequencies of the middle and side transducers. For the specific case illustrated $\theta_o$ is the Bragg angle for a center frequency 270 MHz and, $$\theta_1 = \frac{\lambda o}{2n} \left( \frac{1}{\lambda\ 365\ \text{MHz}} - \frac{1}{\lambda\ 270\ \text{MHz}} \right)$$

$$\theta_2 = \frac{\lambda o}{2n} \left( \frac{1}{\lambda\ 270\ \text{MHz}} - \frac{1}{\lambda\ 200\ \text{MHz}} \right)$$

The acoustic transducer array can consist of any number of transducers found to be convenient. For instance, in FIG. 2, four transducers are shown, and the appropriate angles could be calculated for the frequencies involved using the above-indicated principles. The angles are extremely small, so that in the case of all transducers the light beam is approximately perpendicular to the acoustic wave. Utilizing five transducers in the arrangement of FIG. 2, an illustrative bandwidth of 500 MHz can be obtained in lithium niobate (100 to 600 MHz) and a bandwidth of 250 MHz (50 to 300 MHz) in bismuth germanium oxide.

In an actual apparatus built according to the teachings of FIG. 2, each of the modulated R.F. signal generators 6 and 7 could be comprised of a frequency synthesizer for providing the R.F. frequency desired, which synthesizer is switched by a pulse generator which generates a pulse of appropriate shape which becomes the envelope of the R.F. signal. Laser 8 can be a helium-neon laser, and optics 9 may be a configuration of lenses designed to provide a wide, thin beam which enters and leaves the acoustic medium approximately perpendicular to the propagating waves. Since the acoustic energy is concentrated near the surface of the structure, the laser energy is focussed to interact with the medium in this region. Optics 9 may, for instance, be comprised of spherical beam-expanding lenses followed by cylindrical lenses which expand the beam in the horizontal direction and focus it in the region of the delay line. Optics 10 which follow the acoustic medium may be comprised of a cylindrical lens for re-collimating the light and a spherical lens for focussing it on PIN photodetector 11. Additionally, a filter at center frequency $w_2$ is connected in the photodetector circuit. Further, by way of illustration, the length of each piezoelectric crystal may be 14 cm., the width of the pulses to be correlated may be 20 $\mu$s, and $F_1$ to $F_2$ may be 100 to 600 MHz.

In typical use, only one acoustic transducer on each crystal would be used at the same time. However, it is also possible to arrange the apparatus so that several acoustic waves on each crystal could be processed simultaneously, that is, a multiplexing arrangement could be obtained.

In FIG. 4A, a typical input waveform is shown, and as mentioned above, it is seen to be a modulated R.F. signal. In this particular case, the envelope of the composite signal, or the signal which is to be correlated, is a square wave. If appropriate signals of the general form shown in FIG. 4A are fed to piezoelectric crystals 1 and 2, the correlation of the signals is obtained in the demodulated laser beam output, and this correlation output is shown in FIG. 4B.

We wish it to be understood that we do not desire to be limited to the exact details of construction shown and described, for obvious modifications can be made by a person skilled in the art.

What is claimed is:

1. An acousto-optic apparatus for providing the correlation of first and second electrical signals without the necessity of time inversion, comprising
    first and second acousto-optic interaction media disposed adjacent each other, said second interaction medium having a lower acoustic velocity than said first medium, each of said media having an acoustic transducer means disposed thereon,
    means for applying a high frequency A.C. signal to said transducer means on said first medium, the envelope of which corresponds to said first electrical signal,
    means for applying a high frequency A.C. signal to said transducer means on said second medium, the envelope of which corresponds to said second electrical signal,
    laser means directed to transmit a laser beam across both said media, and
    detector means for detecting said laser beam after it traverses said first and second acousto-optic interaction media.

2. The apparatus of claim 1 wherein said first and second acousto-optic interaction media are first and second piezoelectric crystals each having a long dimension, said crystals being disposed so that the long dimensions of the respective crystals are parallel to each other, said acoustic transducer means being disposed adjacent one end of said crystals, and being oriented so that the acoustic waves generated thereby are propagated approximately parallel to said long dimensions, said laser means being arranged so that said laser beam is directed across said crystals approximately perpendicular to said long dimensions.

3. The apparatus of claim 2 wherein the acousto-optic velocity of said second crystal is a given fraction of the acousto-optic velocity of said first crystal, and wherein the A.C. frequency of the signal applied to the transducer means on said second crystal is said same given fraction of the A.C. frequency of the signal applied to the transducer means on said first crystal.

4. The apparatus of claim 3 wherein each of said acoustic transducer means comprises a plurality of acoustic transducers, each of said transducers being oriented at a very small angle with respect to the adjacent transducer so that the acoustic waves generated thereby are in the direction of said long dimension or at very small angles displaced therefrom, each transducer being adapted for the application of a signal of different A.C. frequency, and said very small angles being the corresponding Bragg angles for the respective frequencies and being determined according to the relationship $$\theta_B = \lambda_o/2n\lambda_a$$

where
$\theta_B$ = Bragg angle
$\lambda_o$ = optical wavelength
$n$ = index of refraction
$\lambda_a$ = acoustic wavelength 5. The apparatus of claim 1 wherein said first interaction medium is a lithium niobate crystal and said second interaction medium is a bismuth germanium oxide crystal.

* * * * *